May 25, 1965   H. C. HIGGINS   3,185,408
AIRCRAFT PROPULSION SYSTEM
Filed July 17, 1963   2 Sheets-Sheet 1

INVENTOR.
HARRY C. HIGGINS
BY Ronald U. Mayes

May 25, 1965
H. C. HIGGINS
3,185,408
AIRCRAFT PROPULSION SYSTEM
Filed July 17, 1963
2 Sheets-Sheet 2
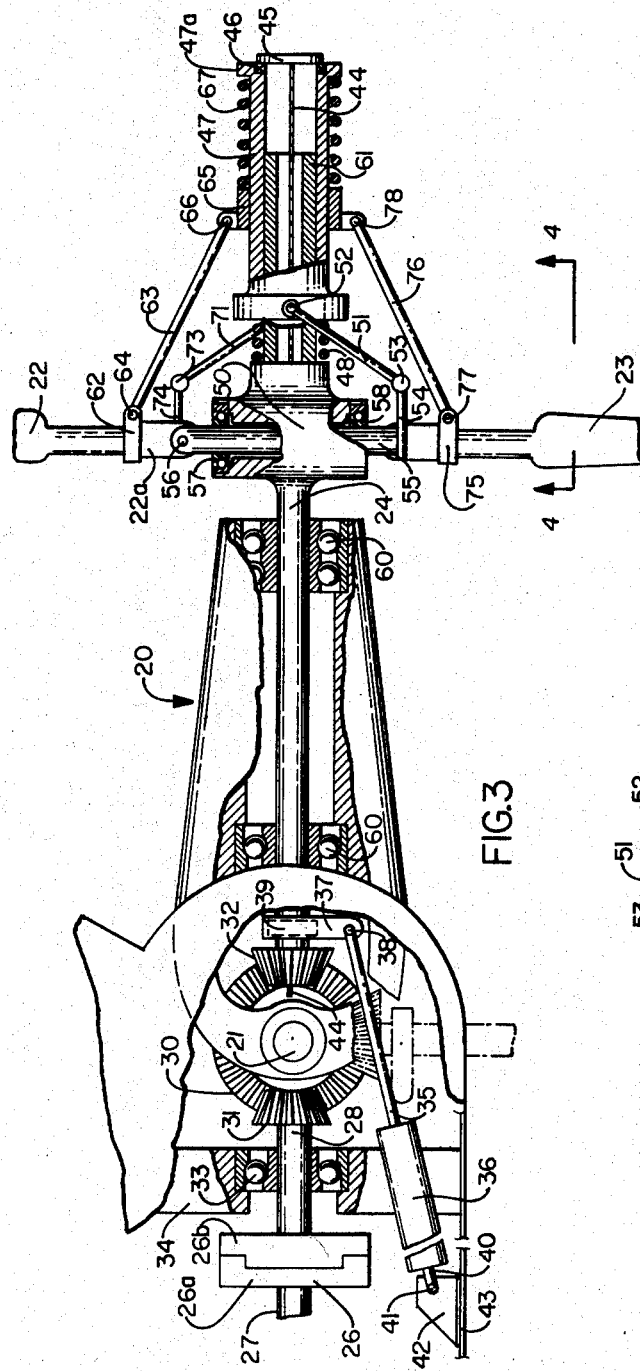
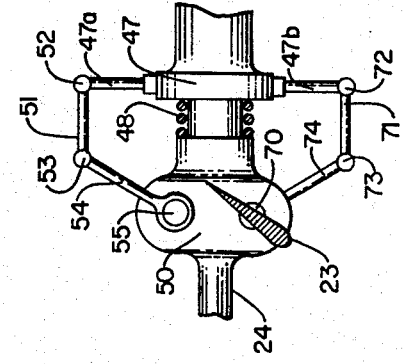
INVENTOR.
HARRY C. HIGGINS
BY

United States Patent Office 3,185,408
Patented May 25, 1965

3,185,408
AIRCRAFT PROPULSION SYSTEM
Harry C. Higgins, Wichita, Kans., assignor to The Boeing
Company, Wichita, Kans., a corporation of Delaware
Filed July 17, 1963, Ser. No. 295,722
6 Claims. (Cl. 244—7)

This invention relates to aircraft propulsion systems for providing an airplane with the capability of hovering, loitering, short take off and landing, and/or vertical take off and landing.

One of the objects of this invention is the provision of a novel aircraft propulsion system for providing an airplane with a capability of hovering, loitering, short take off and landing, and/or vertical take off and landing.

Another object of this invention is the provision of a novel propulsion system, as set forth in the preceding object, having a simple, lightweight, and economically manufactured and installed retractable rotor adapted to be driven by a conventional aircraft engine.

Another object of this invention is the provision of an aircraft propulsion system having a rotor that can be controllably tilted so as to provide vertical and/or thrust components, the blades of the rotor being automatically retracted or folded when the drag forces on the rotor exceeds the thrust on the rotor.

Yet another object of this invention is the provision of a novel aircraft propulsion system adapted to be installed on an airplane so as to provide the airplane with a shorter take off and landing capability and/or vertical take off and landing capability, the propulsion system having a rotor adapted to be driven by the conventional propulsion system of the airplane and being tiltable to any desired position for obtaining horizontal and/or vertical thrust components.

Another object of this invention is the provision of simple, reliable and inexpensive means for controlling the rotor of the novel propulsion system set forth in the preceding object.

The invention further resides in certain novel features of constructions, combinations, and arrangements of parts and further objects and advantages of the invention will be apparent to those skilled in the art to which it pertains from the following description of the present preferred embodiment thereof described with reference to the accompanying drawings, which form a part of this specification, wherein the same reference numerals indicate corresponding parts throughout the several views, and in which:

FIG. 3 is an enlarged fragmentary view of a portion of the novel propulsion system in FIG. 2, but with parts broken away and in section to show certain additional details thereof; and FIG. 4 is an enlarged bottom view of a rotor portion of the propulsion system as viewed along line 4—4 in FIG. 3.

Figure 1:
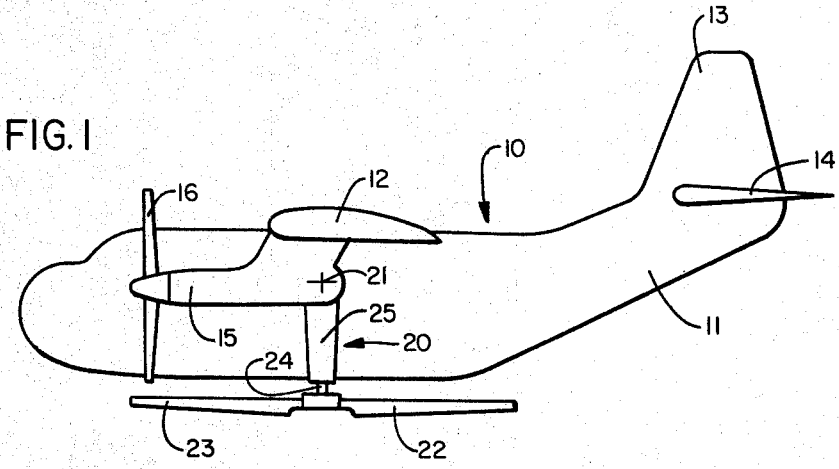
FIG. 1 is a side elevational view of a conventional airplane embodying the invention, the airplane being shown in a vertical or hovering flight mode.

It is to be understood that the invention is not limited to the details of construction and the arrangements of parts shown in the drawings and hereafter described in detail, but is capable of being otherwise embodied and of being practiced and carried out in various ways. It is to be further understood that the terminology employed herein is for the purpose of description and there is no intention to herein limit the invention beyond the requirements of the prior art.

Referring to FIG. 1, reference numeral 10 indicates generally an airplane having a fuselage 11, a fixed wing 12, and an empennage comprising a vertical stabilizer and a control surface 13 and horizontal stabilizers and control surfaces 14. The wing 12 is connected to the fuselage 11 near the top side thereof for providing adequate ground clearance for the operation on a novel propulsion system embodying the invention. A pair of conventional airplane engines 15 are slung below the wing 12 on either side of the fuselage 11 and drive conventional propellers 16. A large rotor means indicated generally by reference numeral 20 is pivotally connected to an horizontal journal shaft 21 at the aft end of the conventional engine 15. The large rotor means 20 may be referred to as an auxiliary propulsion system and the aircraft engine 15 may be referred to as a primary or conventional propulsion system. The auxiliary aircraft propulsion system 20 comprises large foldable or retractable rotors 22, 23 driven by a drive shaft 24 pivotally connected at 21 to the port engine 15. A faired frusto-conical support member 25 encloses the drive shaft 24 and provides a streamlined housing for reducing aerodynamic drag and minimizing aerodynamic turbulence. The member 25 has a pair of arms pivotally connected to the shaft 21.

As seen in FIG. 1 the airplane 10 is in a vertical or hovering mode for vertical take off or landing. The auxiliary propulsion system 20 therefore has its drive shaft 24 vertically aligned and extending through or near the center of pressure of the wings 12 so as to minimize any upset in the flight stability of the aircraft due to shifting centers of pressure and/or centers of weight.

Figure 2:
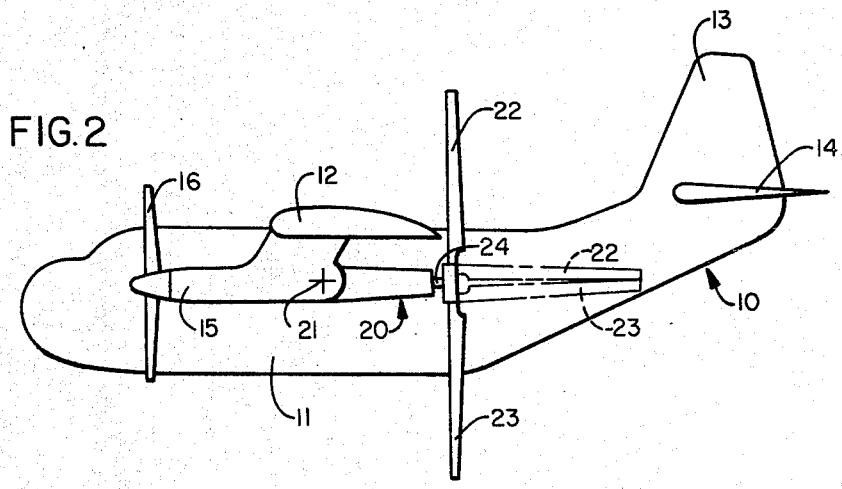
FIG. 2 is a view similar to FIG. 1 but showing the airplane in a normal forward flight mode with the novel propulsion system providing forward thrust, the novel propulsion system having rotors adapted to be folded or retracted as is shown in hidden outline when aerodynamic drag thereon exceeds forward thrust.

FIG. 2 shows the auxiliary propulsion system 20 with its drive shaft 24 horizontally aligned with and coincidental with the direction of flight of the aircraft 10. In this particular horizontal flight mode the large rotors 22, 23 are fully extended for augmenting the forward thrust of the propellers 16 of the conventional propulsion system 15. When the aerodynamic drag on the rotors 22, 23 exceeds the thrust provided thereby the rotors 22, 23 are forced into a retracted or folded position as shown in hidden outline in FIG. 2. There is nothing to hold the rotors 22, 23 in a retracted position other than aerodynamic drag. However, there are state of the art devices available for locking the rotor blades 22, 23 in retracted position. The rotor blades 22, 23 may be quickly retracted in flight by disengaging the auxiliary propulsion system 20 from the drive of the conventional propulsion system 15 preferably by means of an electromagnetic clutch 26, FIG. 3.

As seen in FIG. 3 the clutch 26 has a driving element 26a carried by a drive shaft 27 of the conventional propulsion system 15 adapted to drivingly engage the element 26b fixed to a driven shaft 28. The driven shaft 28 drives the drive shaft 24 of the auxiliary propulsion system 20 through a differential mechanism comprising a beveled ring gear 30 and beveled driven pinion gears 31 and 32. The pinion gear 31 is fixed to the driven shaft 28. The driven shaft 28 is journaled in journal bearing assembly 33 carried by a supporting member 34 within the housing of the primary propulsion system 15. The driven or output pinion 32 is fixed to and drives the drive shaft 24. The ring gear 30 is journaled on the journal shaft 21. The shaft 21 is carried by a supporting member within the housing of the conventional propulsion system 15.

As pointed out hereinabove, the auxiliary propulsion system 20 can be swung from the forward flight mode as shown in FIG. 3 downward to a vertical position for vertical flight mode as shown in hidden outline in FIG. 3. The drive shaft 24 can be tiltably adjusted to any position between the horizontal and vertical flight mode by means of a push-pull piston rod 35 that can be extended or retracted by means of a double acting hydraulic motor 36. The inner end of the push-pull rod 35 is fixed to a piston, not shown, slidably disposed in the cylindrical housing of a motor 36. The outer end of the rod 35 is pivotally connected to a collar 37 carried by the drive shaft 24 by means of a pivot pin 38. The drive shaft 24 is journaled in the collar 37 by means of antifriction bearing 39. The collar 37 is fixed against movement axially of the drive shaft 24. The housing of the motor 36 has an axially extending flange 40 pivotally connected by a pin 41 to a support bracket 42. The bracket 42 is fixed in a conventional manner to a support plate 43 carried within the housing of the conventional propulsion system 15.

As can be seen in FIG. 3, when the motor 36 retracts the push-pull rod 35 the driven pinion 32 carried by the shaft 24 is caused to walk in a clockwise direction around the ring gear 30 to a vertical position as shown by hidden outline. When the auxiliary propulsion system 20 is providing vertical and/or horizontal thrust components additional structure may be needed or desired to transmit the thrust to the airplane 10 via the wings 12. This additional structure does not form a part of this invention and can be provided in a manner well-known in the art.

The pitch of the rotor blades 22 and 23 can be uniformly and simultaneously adjusted by operating a co-axial control cable 44. Both of the rotor blades 22 and 23 are identically operated. The cable 44 has its outer end fixed to a plate 45 journaled on antifriction bearings 46 carried by an outer end of an axially slidable non-rotatable rotor pitch adjusting tube 47. A forward end of the tube 47 bears against an helical spring 48. The spring 48 is buttressed against a shoulder of a rotor hub 50 fixed to and driven by the rotor shaft 24.

As can be seen in FIG. 3 the rotor shaft 24 is hollow or tubular for providing for the passage of the control cable 44 therethrough. The opposite end of the control cable 44 extends between two idler guide pulleys connected to the shaft 21 and is adapted to be controlled by the pilot of the aircraft or alternatively may be controlled automatically by conventional means that do not form a part of this invention. For example, the cable 44 may be wound on a reel, not shown, that is driven and controlled by a synchronous motor in a known manner.

The helical spring 48 constantly urges the propeller pitch tube 47 axially outwardly or rearwardly whereby the rotors 22, 23 are urged to a fully feathered position. A rotor pitch control arm 51 has one end pivotally connected at 52 to a laterally and diametrically extending arm 47a of the forward end of the tube 47, FIG. 4, and the other end pivotally connected at 53 to pitch control lever 54. The lever 54 is fixed to a rotor blade root shaft 55 of the rotor blade 22. The root shaft 55 extends completely through the rotor hub 50 and is pivotally connected by a pin 56 to an inner shank end 22a of the rotor blade 22. The pin 56 permits the rotor blade 22, when fully feathered, to be folded in an aft direction axially along the drive shaft 24. The root shaft 55 is pivotally mounted or journaled in the hub 50 by means of a single row of antifriction assemblies 57 and 58 in the opposite ends thereof.

The rotor shaft 24 is journaled by two double row antifriction bearing assemblies 60 in an aft end of the faired support member 25.

The pitch control tube 47 is slidably disposed upon an aft extending tubular segment 61 forming an extension of the drive shaft 24. The segment 61 is fixed to the hub 50 and the shaft 24. The tube 47 is non-rotatable in the sense that it does not rotate or turn relative to the tube segment 61 but does rotate with the drive shaft 24, rotor hub 50, and the tube segment 61. Pivotally mounted on the inner end of the rotor 22 is a collar 62 having a flange fixed thereto for pivotally supporting a guide link 63 by means of a pivot pin 64. The other end of the guide link 63 is pivotally connected to a flange of a collar 65 by means of a pivot pin 66. The collar 65 is slidably disposed over the pitch control collar 47. A coil spring 67, disposed about and encircling the tube 47, is buttressed by a flange 47a at the outer end of the tube 47. The spring 67 resiliently urges the collar 65 axially towards the rotor hub 50 and acts to resist the retracting or folding of the rotor blades 22, 23. The tension of the spring 67 is adjusted so as to prevent the folding of the blades 22, 23 while the aircraft is parked. The advantage of this feature is that when the rotor shaft is in the vertical mode and the aircraft is parked the spring 67 will prevent the blades 22 and 23 from dropping down and touching the ground. However, when aerodynamic drag forces exceed the thrust forces of the rotor blades 22, 23 the blades will be urged rearwardly into a retracted position as hereinabove described.

As seen in FIG. 4, the rotor blade root shaft 55 is disposed parallel to and coplanar with a rotor blade root shaft 70 of the rotor blade 23. However, both the rotor blade root shafts 55 and 70 are disposed laterally on either side of the longitudinal axis of the drive shaft 24. The pitch of the rotor blade 23 is controlled by a pitch control arm 71 having one end pivotally connected at 72 to a laterally and diametrically extending arm 47b opposite to the arm 47a. The other end of the pitch control arm 71 is pivotally connected at 73 to a pitch control lever 74, FIG. 4. A collar 75 is pivotally mounted on the rotor 23. The collar 75 has a flange fixed thereto for pivotally supporting a guide link 76 by means of a pivot pin 77. The other end of the guide link 76 is pivotally connected to a flange of the collar 65 by means of a pivot pin 78.

It will be understood that this invention can be modified to adapt it to various circumstances and conditions, and it is accordingly desired to comprehend within the purview of this invention such modifications as may be considered to fall within the scope of the appended claims.

What is claimed is:

1. In an airplane, a fuselage having a wing carrying a conventional power plant on either side of the fuselage, conventional propellers disposed forwardly of and driven by each of said power plants for pulling the airplane, rotor means pivotally connected to and driven by each of said power plants for pushing the airplane, means for selectively positioning said rotor means for generating forward thrust for pushing the airplane forwardly in a conventional flight mode and for generating vertical thrust for pushing the airplane upwardly in a hovering flight mode and a vertical flight mode, said rotor means being pivotally connected to each of said power plants near the longitudinal center of lift of the aircraft, said rotor means having foldable blades, means for folding said blades of said rotor means when drag forces thereon exceed by a predetermined amount the thrust generated thereby, means for adjusting the pitch of said rotor blades, means for automatically feathering said blades before said blades are folded to a rearwardly retracted position for presenting minimum drag during flight of the aircraft, and clutch means for engaging and disengaging each of said rotor means from the drive of said power plants.

2. In an airplane having wing means with primary propulsion means carried thereby, secondary propulsion means having rotor means pivotally connected to said primary propulsion means for being pivoted through ninety degrees to and from a vertical flight mode and an horizontal flight mode, means for controlling the angular position of said secondary propulsion means, blade pitch control means for controlling the blade pitch of said rotor means, means for folding the blades of said rotor means and thereby retracting the same for presenting minimum drag in the horizontal flight mode, and means for controlling the folding and retraction of said blades of said rotor means.

3. In an airplane, a fuselage having a wing carrying a conventional power plant on either side of the fuselage, conventional propellers disposed forwardly of and driven by each of said power plants for pulling the airplane, rotor means pivotally connected to and driven by each of said power plants for pushing the airplane, means for selectively positioning said rotor means for generating forward and vertical thrust for pushing the airplane forwardly and upwardly in a selected flight mode, said rotor means having foldable blades, means for folding said blades of said rotor means when drag forces thereon exceed by a predetermined amount the thrust generated thereby, means for adjusting the pitch of said rotor blades, means for automatically feathering said blades before said blades are folded to a rearwardly retracted position for presenting minimum drag during flight of the aircraft, and clutch means for engaging and disengaging each of said rotor means from the drive of said power plants.

4. In an airplane, a fuselage having a wing carrying a conventional power plant, a conventional propeller disposed forwardly of and driven by said power plant for pulling the airplane, rotor means pivotally connected to and driven by said power plant for pushing the airplane, means for selectively positioning said rotor means for generating forward and vertical thrust for pushing the airplane forwardly and upwardly in a selected flight mode, said rotor means having foldable blades, means for folding said blades of said rotor means when drag forces thereon exceed by a predetermined amount the thrust generated thereby, means for adjusting the pitch of said rotor blades, means for automatically feathering said blades before said blades are folded to a rearwardly retracted position for presenting minimum drag during flight of the aircraft, and clutch means for engaging and disengaging said rotor means from the drive of said power plant.

5. In an airplane, a fuselage having a wing carrying a conventional power plant, rotor means pivotally connected to and driven by said power plant for pushing the airplane, means for selectively positioning said rotor means for generating forward and vertical thrust for pushing the airplane forwardly and upwardly in a selected flight mode, said rotor means having foldable blades means for folding said blades of said rotor means, means for adjusting the pitch of said rotor blades, and clutch means for engaging and disengaging said rotor means from the drive of said power plant.

6. In an airplane having wing means, propulsion means having rotor means and pivotally connected to the airplane for being pivoted through ninety degrees to and from a vertical flight mode and an horizontal flight mode, means for controlling the angular position of said propulsion means, blade pitch control means for controlling the blade pitch of said rotor means, means for folding the blades of said rotor means and thereby retracting the same for presenting minimum drag in the horizontal flight mode, and means for controlling the folding and retraction of said blades of said rotor means.

References Cited by the Examiner

UNITED STATES PATENTS

| | | | |
|---|---|---|---|
| 2,219,980 | 10/40 | Seversky | 244—54 |
| 2,478,847 | 8/49 | Stuart | 244—7 |
| 2,510,216 | 6/50 | Figley | 170—160.11 |
| 2,869,649 | 1/59 | Lux | 170—160.11 |
| 3,089,666 | 5/63 | Quenzler | 244—7 |

FOREIGN PATENTS 1,005,200  12/51  France.

FERGUS S. MIDDLETON, *Primary Examiner.*